United States Patent Office 2,882,317
Patented Apr. 14, 1959

2,882,317

PREPARATION OF BORON-CONTAINING COMPOUNDS

Arthur K. Hoffmann, Stamford, Conn., and Stephen J. Groszos, Cincinnati, Ohio, assignors to American Cyanamid Company, New York, N.Y., a corporation of Maine No Drawing. Application March 4, 1958
Serial No. 718,963

5 Claims. (Cl. 260—543)

This invention relates broadly to the preparation of boron-containing compounds and, more particularly, to a new and novel method of preparing dihaloborines, specifically dibromoborines, and with the corresponding boronic acids. Still more particularly the invention relates to a method of preparing boron-containing compounds which comprises effecting reaction between a boron trihalide, specifically boron tribromide, and an organic compound capable of yielding a free radical. Such organic compounds include those comprising both alkyl and aryl groups in the molecule thereof, and more particularly a hydrocarbon composed (consisting solely) of both alkyl and aryl groups in the molecule thereof. In practicing the invention the reaction between the aforesaid reactants is effected while they are in intimate contact (e.g., admixed) with a catalytic amount of a free-radical catalyst, more particularly an organic azo compound hereinafter generically identified and which is exemplified by alpha,alpha'-azobisisobutyronitrile, thereby forming a compound represented by the general formula Ar—Alk—BBr$_2$ wherein Ar—Alk— represents a hydrocarbon radical composed of both alkyl and aryl groups, the alkyl grouping thereof being attached directly to B, i.e., to the boron atom of the compound.

No prior art that is pertinent to the present invention is known. The organic azo compounds that are used as catalysts in carrying the invention into effect are those which are disclosed in Hunt United States Patent No. 2,471,959, dated May 31, 1949, which also discloses and claims their use in a process for polymerizing ethylenically unsaturated monomers that are capable of undergoing addition polymerization.

The present invention provides a novel and useful means of forming boron-carbon bonds, that is, for introducing boron into certain organic compounds. Reactions between organic reactants and boron-containing compounds leading to the establishment of a carbon-boron covalent bond have heretofore been relatively little investigated. The known reactions of this general type fall overwhelmingly into one mechanistic category which involves the displacement of some leaving group on boron by a reactant having carbanionic character. Boron halides and esters have been employed as the substrate molecules while Grignard reagents, organolithium and organosodium derivatives have been used as the displacing agents.

The invention involved herein is based on our initial observation that the decomposition of an azo compound of the kind exemplified by alpha,alpha'-azobisisobutyronitrile at 80° C. in toluene containing boron tribromide yielded benzylboron dibromide, which then could be hydrolyzed to benzylboronic acid. Although we are unable to state with certainty the reasons why this reaction proceeds as it does, it is possible that it proceeds in accordance with either one or the other of the two mechanisms shown below and wherein I in the equations represents the initiator or catalyst (azo compound, specifically):

(I)
(1)      I$_2$ ⟶ 2I·

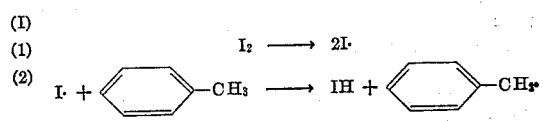

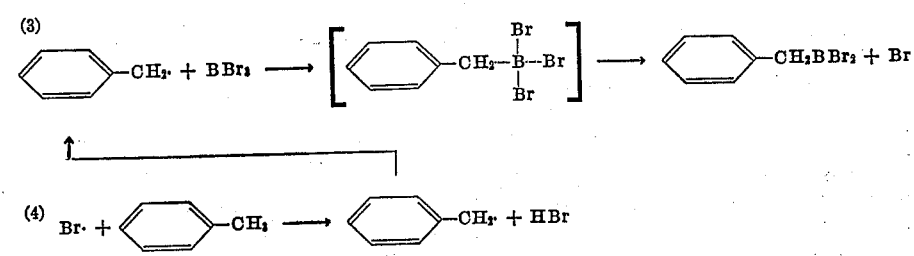

(II)
(1)
(2)

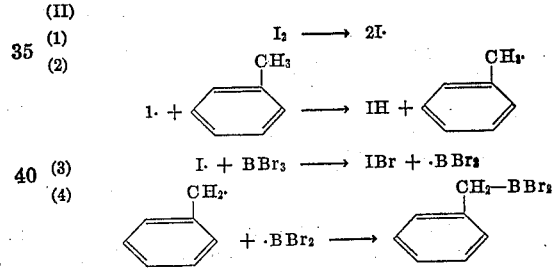

Mechanism I proceeds by a chain reaction where initiator molecules merely serve to start new chains, the bromine atom serving as the chain-transfer agent. Mechanism II is not a chain reaction, product being formed in a termination step. This process, in contrast to mechanism I, utilizes initiator as a reactant. It is not known at this time which of these two schemes best explains this reaction.

Independent support for each mechanism exists; SN$_2$ type radical displacement reactions are known (R. M. Noyes, Sixth Reaction Mechanism Conference, Swarthmore, Pennsylvania, September 1956), and their extension from saturated carbon atoms to a boron atom containing an open P orbital is reasonable, giving support to step 3 of mechanism I. (Steps 1, 2, and 4 are sufficiently well established to require no further justification.) The primary objection to mechanism II is step 3, postulating the existence of a boron dibromide free radical. The existence of such a radical, however, is indicated by the fact that boron trichloride, when subjected to an electric discharge in the presence of mercury, is converted to tetrachlorodiborane. (T. Wartik, R. Moore, and H. I. Schlesinger, J. Am. Chem. Soc., 71, 3265 [1949]). The mercury, acting as a chlorine-atom scavenger, tends to suppress recombination of chlorine atoms and boron dichloride radicals and permits the concentration of boron dichloride radicals to increase sufficiently to dimerize.

Of general applicability as a reactant in the process of the present invention are hydrocarbons composed of both alkyl and aryl groups in the molecules thereof, and more particularly the various alkyl-substituted aromatic hydrocarbons (both monocyclic and polycyclic) of the benzene (including biphenyl and terphenyl), naphthalene and anthracene series. Examples of such hydrocarbons are the mono-, di- and trimethyl, -ethyl, -propyl, -isopropyl, -n-butyl, -isobutyl, -sec.-butyl, -tert.-butyl, -amyl to -octadecyl, inclusive (both normal and isomeric forms), benzenes, biphenyls, terphenyls, napthalenes and anthracenes; the various diphenylene alkanes (e.g., fluorene, diphenylene ethane, diphenylene propane, diphenylene butane, diphenylene pentane, diphenylene hexane, etc.); the various diphenyl alkanes, e.g., diphenyl methane (benzylbenzene), diphenyl ethane, diphenyl propane, diphenyl butane, diphenyl pentane, diphenyl hexane, etc.); the naphthylenealkylenes, e.g., acenaphthene (naphthyleneethylene), naphthylenepropylene, etc.; as well as others. One can use as the hydrocarbon reactant any monoalkyl- or polyalkyl-substituted aromatic hydrocarbon, including those of the above-mentioned hydrocarbon series.

If the hydrocarbon reactant is one which is normally a solid at room temperature, then the reaction mixture often advantageously may include an inert, anhydrous (substantially completely anhydrous) liquid medium, i.e., a solvent or diluent, for instance, a saturated normal alkane, e.g., n-hexane, n-heptane, n-octane, n-nonane, n-decane, etc.

The organic azo compounds to which reference was made in the first paragraph of this specification and which are an essential feature of the process disclosed and claimed in the present application are those containing an acyclic azo group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen.

Stated otherwise, it may be said that of general applicability in the process of this invention are azo compounds which have an acyclic azo, —N=N—, group bonded to different, i.e., distinct, more piclularly separate or discrete, carbons which are non-aromatic, that is, aliphatic or cycloaliphatic, at least one of which is tertiary.

The more active and therefore more preferred catalysts within the above-described broad class of azo compounds are those in which the tertiary carbon has attached to it through carbon a radical in which the three remaining valences of the latter carbon are satisfied by at least one element of atomic number 7–8 (oxygen and/or nitrogen). Symmetrical azo compounds having two tertiary carbons attached to the azo nitrogens and having, as the negative group attached to the tertiary carbons, the nitrile, carbonamide, or carbalkoxy group have increased activity at lower temperatures and, therefore, are preferred. The negative radical in general is neutral with respect to acidity, and of these neutral radicals the nitrile is especially suitable, since the azonitriles are readily obtained and have high activity; also very suitable, because of their ease of preparation from available ketones, are the nitriles of alpha,alpha'-azodialkanoic acids and the lower (1 to 6 carbon atoms) alkyl esters and the amides of such acids.

Examples of azo catalysts which may be used in the process of this invention and which have one tertiary carbon are alpha-(carbamylazo)-alpha-phenylpropionitrile, alpha-(carbamylazo)-alpha-cyclopropylpropionitrile, alpha-(carbamylazo)isobutyramide, and hexyl alpha-(carbamylazo)-alpha,gamma-dimethylvalerate. These compounds may be prepared by the procedure described by Thiele and Strange, Ann., 283, 33–37 (1894).

Catalysts which are symmetrical and accordingly have two tertiary aliphatic or alicyclic carbons, i.e., tertiary carbons aliphatic in character, attached to the azo nitrogens are usually active 10–20° C. lower than those having only one tertiary group. Examples of these preferred compounds include: alpha,alpha'-azodiisobutyronitrile, alpha,alpha'-azobis(alpha-methylbutyronitrile), alpha,alpha'-azobis-(alpha-cyclopropylpropionitrile), alpha,alpha'-azobis(alpha-cycloheptylpropionitrile), alpha,-alpha'-azobis(alpha,gamma-dimethylcapronitrile), alpha,alpha'-azobis(alpha-isobutyl-gamma-methylvaleronitrile), 1,1'-azodicyclohexane-carbonitrile, 1,1'-azobis(3-methylcyclopentanecarbonitrile), 1,1' - azodicamphanecarbonitrile (the azonitrile derived from camphor), and the corresponding amides and esters of the above in which the nitrile group or groups are replaced by amide and/or ester groups, e.g., to give alpha,alpha'-azodiisobutyramide, alpha,alpha'-azobis(alpha, gamma-dimethylvaleramide), alpha,alpha' - azobis(alpha - cyclopropylpropionamide), 1,1'-azodicyclohexanecarbonamide, N,N' - alpha - alpha'-azodiisobutyrodiethylamide, dimethyl 1,1'-azodicyclohexanecarboxylate, and dimethyl, diethyl and dihexyl alpha,-alpha' - azodiisobutyrate. Advantageously lower alkyl esters, e.g., of the 1–6 carbon alcohols, are used as catalysts in view of the ease and economy in preparing such esters.

Other examples of azo compounds that can be used as catalysts or initiators in the process of the present invention are given in the aforementioned Hunt Patent No. 2,471,959.

The azonitriles may be prepared by the process described by Thiele and Heuser, Ann. 290, 1–43 (1896); Hartmann, Rec. Trav. Chim., 46, 150–153 (1927); Chem. Weekblad., vol. 23, pages 77–78, January 1926; and Cox, J. Am. Chem. Soc., 47, 1471–1477 (1925). A particularly effective and desirable method is that set forth by Alderson and Robertson in their Patent No. 2,469,358. The azonitriles can be converted to amides and esters, e.g., by formation of the iminoether hydrochloride by reaction with dry hydrogen chloride and an anhydrous alcohol followed by reaction with ammonia or the appropriate hydrogen-bearing amine, or with water. Thiele and Heuser (cited above) show the preparation of azo esters and amides.

In general, the more useful catalysts have aliphatic or cycloaliphatic radicals of 4–11 carbons on each of the azo nitrogens and usually have carbon and hydrogen or carbon, hydrogen and oxygen as the elements in the radical excepting the negative substituent on the tertiary carbon.

The particularly preferred catalysts are the alpha, alpha'-azobis(aliphatic nitriles) and especially the alpha, alpha'-azobis(alkanenitriles) of 4–8 carbons on each of the azo nitrogens.

In carrying the present invention into effect, the reaction between the boron trihalide and the organic compound capable of yielding a free radical or radicals, more particularly a hydrocarbon composed of both alkyl and aryl groups in the molecule thereof, is effected under substantially completely anhydrous conditions. By "substantially completely anhydrous conditions" it is meant that the reaction is effected under conditions such that no more than a trace of water is present or the amount of water that might be present in the commercial materials introduced into the reaction mixture. Similarly, by "substantially completely anhydrous" liquid medium is meant one that contains no more than a trace of water or the amount of water that might be present in the commercial product.

The reaction between the boron trihalide, specifically boron tribromide, and the hydrocarbon composed of both alkyl groups and aryl groups in the molecule thereof is effected at a temperature ranging from about 10° C. to about 200° C., more particularly at a temperature ranging from 15° C. to 100° C., and still more particularly from 15° C. to 85° C. with such catalysts as, for example, alpha,alpha'-azobisisobutyronitrile. The reaction temperature is considerably influenced by the particular catalyst used in practicing the invention, but generally the reaction is carried out at a temperature of from 30° C. or 35° C. to 140° C. or 150° C. Higher temperatures, e.g., up to 200° C., may be particularly useful when it is desired to complete the reaction in a minimum of time, for instance in a continuous process.

The molar ratio of boron trihalide and hydrocarbon reactants may be considerably varied, but ordinarily they are used in a molar ratio of from 0.5 mole to 10 moles of boron trihalide, specifically boron tribromide, per mole of the hydrocarbon reactant. Approximately equal molar proportions of reactants often may be used advantageously. In the event that a large excess of boron tribromide is employed, the excess may be recovered from the reaction mass after completion of the reaction by vacuum evaporation, followed by fractional distillation if required.

The catalytic amount of azo compound used as a catalyst or initiator in practicing the present invention also may be considerably varied. Ordinarily, however, the amount of azo compound ranges from, for example, about 0.5 part or 1 part by weight of catalyst per thousand parts by weight of the primary reactants (boron trihalide plus free-radical-yielding organic compound) to a molar ratio of catalyst/primary reactants equal to or greater than 1.

At the end of the reaction period, the dihaloborine may, if desired, be isolated from the reaction mass by known methods; or, as is more commonly done, the reaction mass containing the dihaloborine is hydrolyzed (e.g., as is more fully described in the examples which follow), and the resulting boronic acid is isolated from the reaction mass, for instance by filtration to remove solids, and evaporating the filtrate to collect the residue comprising the desired boronic acid.

In order that those skilled in the art may better understand how the present invention can be carried into effect, the following examples are given by way of illustration and not by way of limitation. All parts and percentages are by weight unless otherwise stated.

*Example 1*

In a 150 ml. round-bottomed flask equipped with a reflux condenser, nitrogen inlet and gas outlet (dipping below the surface of a mercury bubbler tube a depth of about 0.5 cm.) a Teflon-coated magnetic stirring bar, and a reflux condenser, the top of which is connected to the gas outlet tube, is placed 2.0 g. (0.012 mole) of alpha,alpha'-azobisisobutyronitrile. Anhydrous toluene, 16.5 g. (0.178 mole) is then added, and stirring is begun. The solution is cooled in a Dry Ice-acetone bath and the flask thoroughly flushed with nitrogen. Freshly distilled boron tribromide, 26.5 g. (0.105 mole), is then added by means of a hypodermic syringe. The Dry Ice bath is removed and the flask is allowed to warm to room temperature (about 20° C.–25° C.). During the warm-up period, the reaction mass sets to a lemon yellow crystalline mass, which no longer permits magnetic stirring. The reaction mass is gently warmed over a hot-plate air-bath, and at 35° C. gas evolution commences. Stirring is effected, since at this temperature and above a light-orange liquid phase is present, thereby permitting stirring. The temperature of the reaction mass is brought to 55° C. over a period of 80 minutes, and to 80° C. over a period of another hour. The reaction mass is then heated and stirred at 80° C. for 1 hour, at the end of which time it is allowed to cool and is set aside. The cooled reaction mass is filtered under an atmosphere of nitrogen, and the separated solid is washed with three successive 10 ml. portions of toluene during filtration. The filtrate contains benzylboron dibromide.

The filtrate, after decomposition with ice, is well extracted with small portions of aqueous 1 N sodium hydroxide; the aqueous alkaline extract is extracted with ether and the aqueous layer is acidified. The acid layer is then well extracted with small portions of ether, the ether extracts are combined, dried over anhydrous magnesium sulfate, and evaporated. The solid residue comprises benzylboronic acid as evidenced by the fact that it is infra-red spectroscopically identical with an authentic sample of benzylboronic acid. Yield, approximately 100 mg., which corresponds to 6% of theory based on alpha,alpha'-azobisisobutyronitrile.

*Example 2*

Example 1 is repeated exactly with the exception that, instead of 0.012 mole of alpha,alpha'-azobisisobutyronitrile, there is used 0.012 mole of dimethyl alpha-alpha'-azodiisobutyrate. Similar results are obtained.

*Example 3*

Same as in Example 1 except that, in place of 0.012 mole of alpha,alpha'-azobisisobutyronitrile there is employed 0.012 mole of alpha,alpha'-azobis(alpha,gamma-dimethylvaleronitrile); and the reaction mass is brought to 60° C. over a period of 1½ hours, then to 90° C. over a period of 1 hour, and is then heated and stirred at 90° C. for ½ hour.

*Example 4*

In a round-bottomed flask equipped as in Example 1 is placed 3 g. of alpha,alpha'-azobisisobutyronitrile and 20 g. of p-xylene. Stirring is begun and the flask is thoroughly flushed with nitrogen. After cooling to 15° C., 27 g. of boron tribromide is added dropwise slowly, maintaining the temperature at 15° C. After the boron tribromide has all been added, the flask is allowed to warm to room temperature. The reaction mixture is gently warmed to 35° C. over a period of 1 hour. During a second 1-hour period, the temperature is raised to 55° C., and finally, over a third 1-hour period, to 80° C. After stirring for one hour at 80° C., the reaction mass is cooled to room temperature and filtered under a nitrogen atmosphere. The solid residue is washed with small additional portions of xylene, which are combined with the filtrate. The filtrate contains p-methylbenzylboron dibromide.

The filtrate, after decomposition with ice, is well extracted with small portions of aqueous 1 N sodium hydroxide. The aqueous alkaline extracts are combined, extracted with ether, and the aqueous layer is acidified. The acid layer is then well extracted with small portions of ether. The ether extracts are combined and, after drying over anhydrous magnesium sulfate, are evaporated in a nitrogen stream to give a solid residue which comprises p-methylbenzylboronic acid. The yield is about 10% of theory, based on alpha,alpha'-azobisisobutyronitrole.

*Example 5*

Essentially the same procedure is followed and ingredients are used as described under Example 4 with the exception that instead of 3 g. of alpha,alpha'-azobisisobutyronitrile, there is used 3 g. of alpha,alpha'-azobisisobutyramide. The solid residue obtained upon evaporation of the ether extracts comprises p-methylbenzylboronic acid. The yield is about 9% of theory, based on alpha,alpha'-azobisisobutyramide.

*Example 6*

Same as in Example 4, except that 20 g. of ethylbenzene (phenylethane) is employed in place of 20 g. of p-xylene and, instead of xylene, ethylbenzene is used as a washing agent. The filtrate contains ethylbenzylboron dibromide; and after hydrolysis and ether extractions the solid residue obtained upon evaporation of the ether extract comprises ethylbenzylboronic acid in a small yield.

Example 7

The procedure followed and ingredients used are exactly the same as in Example 6 with the exception that instead of using 3 g. of alpha,alpha'-azobisisobutyronitrile there is employed 3 g. of alpha,alpha'-azobis(alpha,gamma-dimethylcapronitrile).

Example 8

Essentially the same procedure is followed and ingredients are employed as in Example 4 with the exception that, instead of 20 g. of p-xylene, there is used 26.8 g. of alpha-methylnaphthalene (1-methylnaphthalene), and, as a solvent medium, 50 g. of n-octane. The filtrate contains naphthyl-1-methylboron dibromide; and after hydrolysis and ether extractions, the solid residue obtained upon evaporation of the ether extract comprises naphthyl-1-methylboronic acid in a small yield.

Example 9

The procedure is essentially the same as in Example 4, but the reactants and free-radical catalyst used are 27 g. of boron tribromide, 31.7 g. of diphenylmethane (benzylbenzene) and 3 g. of alpha,alpha'-azobis(alpha-methylbutyronitrile). Additionally, 60 g. of n-nonane is included as a solvent medium. The filtrate contains phenylbenzylboron dibromide; and after hydrolysis and ether extractions the solid obtained upon evaporation of the ether extract comprises phenylbenzylboronic acid in a small yield.

Example 10

The procedure is essentially the same as in Example 4, but the reactants and free-radical catalyst used are 27 g. of boron tribromide, 31.3 g. of fluorene (diphenylenemethane) and 3 g. of alpha-(carbamylazo) isobutyronitrile. To the reaction mixture also is added 60 g. of n-octane as a solvent medium. The filtrate contains fluorenylboron dibromide; and after hydrolysis and ether extractions the solid residue obtained upon evaporation of the ether extract comprises fluorenylboronic acid in a small yield.

We claim:

1. The method which comprises effecting reaction between a boron tribromide and a hydrocarbon composed of both alkyl and aryl groups in the molecule thereof thereby to form a compound represented by the general formula Ar—Alk—BBr$_2$ wherein Ar—Alk— represents a hydrocarbon radical composed of both alkyl and aryl groups, the alkyl grouping thereof being attached directly to B, said reaction being effected under substantially completely anhydrous conditions, at a temperature ranging from about 10° C. to about 200° C., and while the said reactants are in contact with a catalytic amount of an organic azo compound containing an acyclic azo group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen.

2. A method as in claim 1 wherein the reaction is effected at a temperature ranging from 15° C. to 100° C.

3. A method as in claim 1 wherein the hydrocarbon that is composed of both alkyl and aryl groups is toluene.

4. A method as in claim 1 wherein the organic azo compound is alpha,alpha'-azobisisobutyronitrile.

5. The method which comprises effecting reaction between boron tribromide and toluene under substantially completely anhydrous conditions, at a temperature ranging from 15° C. to 85° C., and while the said reactants are admixed with a catalytic amount of alpha,alpha'-azobisisobutyronitrile, thereby to form benzylboron dibromide.

References Cited in the file of this patent

Beilstein, Bd. 16 (Isocyclische Reihe) p. 922 (1933).